United States Patent [19]

Theuer

[11] 4,282,265
[45] Aug. 4, 1981

[54] FAT COMPOSITIONS FOR INFANT FORMULAS

[75] Inventor: Richard C. Theuer, Westport, Conn.

[73] Assignee: Bristol-Myers Company, New York, N.Y.

[21] Appl. No.: 112,041

[22] Filed: Jan. 14, 1980

[51] Int. Cl.³ ............................................. A23D 5/00
[52] U.S. Cl. ................................. 426/607; 426/585; 426/801
[58] Field of Search ................ 426/585, 601, 607, 801

[56] References Cited

U.S. PATENT DOCUMENTS

| | | | |
|---|---|---|---|
| 2,659,676 | 11/1953 | Howard et al. ................ | 426/801 X |
| 3,542,560 | 11/1970 | Tomarelli et al. ............. | 426/801 X |
| 3,649,295 | 3/1972 | Bernhart ....................... | 426/801 X |

OTHER PUBLICATIONS

Webb et al., By Products from Milk, 2nd ed., The Alvi Publ. Co., Inc., Westport Conn., 1970, (pp. 263, 264 and 395–399).

*Primary Examiner*—David M. Naff
*Attorney, Agent, or Firm*—R. E. Carnahan; R. H. Uloth

[57] ABSTRACT

Vegetable oil mixtures are prepared containing from 20–50% by weight of palm oil and quantities of lauric acid oils, oleic acid oils, and linoleic acid oils needed to provide proportions of oleic, palmitic, and linoleic triglycerides similar to proportions in human milk. The mixtures are readily absorbed by normal full-term infants and are well suited as fat ingredients for infant formulas.

4 Claims, No Drawings

FAT COMPOSITIONS FOR INFANT FORMULAS

FIELD OF THE INVENTION

The present invention refers to products per se prepared by combining diverse food materials in which the basic ingredient in certain embodiments is lacteal derived and contains fat or oil other than lacteal derived (Class 426, subclass 585). More particularly, it refers to fat compositions useful in preparing such products (Class 426, subclass 601). The fat compositions are intended particularly as ingredients for infant formulas of the cow milk based, and of the soybean or other vegetable protein based types.

DESCRIPTION OF THE PRIOR ART

The development of infant formulas for use as the sole source of alimentation substantially from birth until weaning and having nutrient compositions similar to human milk has been an object of nutritional research for many years. Such formulas having percentage compositions of protein, carbohydrate, and fat corresponding to human milk have been available for many years and have met with wide commercial success. These formulas are principally filled milks containing milk protein and carbohydrate and various animal or vegetable fats to provide the desired fat concentration. Vegetable protein-based infant formulas containing no milk protein or carbohydrate are also in wide use. Improvements have been made with respect to the nature of protein and carbohydrate components. Improvement is still needed, however, in regard to the selection of the fat ingredients for use in such infant formulas.

Substantial differences have been shown to exist in the extent of absorption of various fats and this has been related to the fatty acid composition of the fat ingredients employed. Refer, for example, the Tomarelli, et al., U.S. Pat. No. 3,542,560 patented Nov. 24, 1970 who have shown a variation in the degree of absorption of palmitic acid containing triglycerides in laboratory animals depending upon whether the palmitic acid moiety is esterified at the alpha (i.e. primary) or at the beta (i.e. secondary) hydroxyl group of glycerol. Triglyceride compositions having 25% or more of esterified palmitic acid and having a high proportion of the palmitic ester groups at the beta position were shown to be better absorbed than triglycerides having lower proportions of palmitic acid esterified at the beta position. An oleo, palm, peanut, coconut oil composition (OPPC) having a fatty acid composition similar to human milk except that 18% of the esterified palmitic acid was in the beta position was 78.2% absorbed while human milk (68% of esterified palmitic acid in the beta position was 92.4% absorbed.

Bernhart, U.S. Pat. No. 3,649,295 patented Mar. 14, 1972 contains data on the extent of fat absorption by newborn infants for various fat compositions. For instance, a fat composition containing palm oil 35%, oleo oil 25%, coconut oil 20%, and peanut oil 20%, providing esterified palmitic acid, oleic acid, and linoleic acid in substantially the same proportions as human milk was shown to be absorbed to the extent of 81.7% in 7 to 10-day old infants as opposed to 85% fat absorption observed with human milk. Calcium absorption by the infants fed the formula containing the fat composition was only ½ that of infants fed human milk.

Both the Bernhart and Tomarelli, et al, fat compositions referred to above contained lard or oleo oil, both animal fats. It is an object of the present invention to provide a fat composition for use in an infant formula which consists only of vegetable oils and contains oleic acid, palmitic acid, and linoleic acid in substantially the same proportions as are present in the fat of human milk. Animal fats are undesirable for use in infant formulas because they may contain fat soluble environmental contaminants such as diethylstilbesterol, pesticides, polychlorinated biphenyls, polybrominated biphenyls and other similar undesirable compounds which accumulate in the adipose tissue of animals. Lard is the only natural fat containing the three subject fatty acids in approximately the same proportions as present in human milk, but it is unacceptable to many on religious grounds. Oleo oil is destearinated beef fat which is processed from the natural material by various methods, and varies considerably in composition depending upon the locality where the animals are grown and the method in which the fat is processed. The palmitic acid content of oleo oil varies for instance from 24 to 31%, the stearic acid content from 17 to 26%, and the oleic acid content from 34 to 43%.

SUMMARY OF THE INVENTION

A survey of the literature as to the fat composition of human milk of mothers from all parts of the world on widely varying diets has revealed that oleic acid and palmitic acid are the predominating fatty acids present regardless of diet or location. They constitute the following percentage proportions by weight of the total fatty acids contained in human milk fat, and in the aggregate constitute at least 50% of the triglyceride fatty acids.

Oleic acid 28–46%, average 36%
Palmitic acid 18–28%, average 23%

The other fatty acids which make up the triglycerides of human milk vary over a relatively wide range depending upon the composition of the diet. Accordingly, one object of the present invention is to provide a fat composition constituted entirely of vegetable fats and containing oleic acid and palmitic acid in the proportions given above for use as the sole fat ingredient in an infant formula. More preferred percentage ranges are 33–40% oleic acid and 20–24% for palmitic acid. The phrase "for use as the sole fat ingredient in an infant formula" is not intended to exclude the presence in the formula of small amounts of fats present adventitiously as a contaminant or minor constituents of other ingredients such as the residual butter fat in skim milk when the latter is used as an ingredient.

An additional consideration for a humanized fat composition made of vegetable oils is to provide a physiological level of linoleic acid. Inadequate amounts of dietary essential fatty acids produce a nutritional deficiency disease. Excessive levels of linoleic acid can be harmful. The foregoing literature survey has revealed that milk fat from lactating mothers contains from about 6% to 16% linoleic acid. Accordingly, a further object of the present invention is to provide a fat composition for use in infant formulas containing the foregoing proportions of oleic acid and palmitic acid, in addition, from 6% to 16% of the fatty acids of the fat composition being linoleic acid. Percentages are on a weight percentage basis.

DETAILED DESCRIPTION OF THE INVENTION tion being linoleic acid. This is shown in the fatty acid pattern data given in the lower portion of the table.

| Type of Oil (preferred range) | | Specific Examples (percent by weight) | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Lauric Acid Oils (10–45%) | Coconut Oil | 25 | 30 | | 30 | | | | | 25 | | | 30 |
| | Barbassu Oil | | | | | 40 | | | | | 25 | | |
| | Palm Kernel Oil | | | 35 | | | 20 | 40 | 45 | | | 33 | |
| Palmitic Acid Oil (20–50%) | Palm Oil | 40 | 35 | 40 | 40 | 20 | 50 | 40 | 35 | 35 | 40 | 42 | 40 |
| Oleic Acid Oils (10–25%) | Oleic Oil | 20 | 20 | 15 | 15 | | 20 | | 20 | | 25 | 10 | 20 |
| | Olive Oil | | | | | 20 | | 20 | | 25 | | | |
| Linoleic Acid Oils (0–20%) | Corn Oil | 15 | 15 | 10 | 15 | 20 | | | | | | 15 | 10 |
| | Soybean Oil | | | | | | | | | 15 | | | |
| | Sunflower Seed | | | | | | 10 | | | | | | |
| | Safflower Oil | | | | | | | | | | 10 | | |
| Fatty acid pattern of Examples 1–2 as % by weight of total fatty acids | Oleic Acid | 37.2 | 35.6 | 35.3 | 33.6 | 33.4 | 40.1 | 35.2 | 35.9 | 36.0 | 40.7 | 33 | 38.4 |
| | Palmitic Acid | 23.1 | 21.2 | 22.8 | 23.2 | 17.8 | 25.8 | 24.0 | 20.4 | 22.9 | 22.0 | 23 | 25.4 |
| | Linoleic Acid | 15.1 | 14.7 | 11.8 | 14.6 | 16.0 | 14.1 | 6.4 | 6.5 | 14.1 | 14.9 | 14 | 12.8 |

The fat compositions and infant formulas containing them which are the subject of this invention have advantages over prior art compositions in that they are constituted entirely of vegetable oils which provide triglycerides containing oleic, palmitic, and linoleic acids, in the same proportions as they occur in human milk. When constituted with protein and carbohydrate ingredients which are nutritionally acceptable for use in infant formulas in amounts comparable to those which occur in human milk, they afford synthetic formulas which are low in cost, have desirable functional characteristics, and the nutrients of which including fats are better absorbed than prior compositions, and comparably to absorption thereof from human milk.

There are four types of vegetable oils which are suitable for use in the present fat compositions and infant formulas prepared therefrom. These are the lauric acid oils, the palmitic acid oils, the oleic acid oils, and the linoleic acid oils. The following tabulation of specific examples indicates the weight percentage amounts of these various classes of oils which may be used in the present compositions and also identifies specific oils of each of these types. One or more of each of the identified oils of each class may be used in any given formulation.

Preferred fat compositions of the present invention include 20–50% by weight of palm oil with the balance being made up of oils selected to provide the fatty acid composition referred to above. More preferred fat compositions include in addition 10–45% by weight of a lauric acid oil, and 10–25% of an oleic acid oil. Up to 20% of a linoleic acid oil may be used in any of the present compositions as is necessary to adjust the contribution of linoleic acid to the total esterified fatty acid content of the composition to within the range of 6–16% by weight.

Where it is indicated in the following table that the linoleic acid oils constitute from 0–20% by weight of the fat composition, this is not intended to indicate that linoleic acid may be absent from the claimed fat composition. In those instances such as in Examples 7 and 8 where no oil of this class is employed in the composition, sufficient linoleic acid is provided by the other oils contained in the composition to meet the requirement of 6–16% by weight of the total fatty acids of the composi-

EXAMPLE 13 Nutritionally Complete Infant Formula

A formula base sufficient for a 100 kg. batch of formula is prepared from the following ingredients:

| (1) | Lactose | 22.6 kg. |
|---|---|---|
| (2) | Palm oil | 11.10 kg. |
| (3) | Coconut oil | 8.32 kg. |
| (4) | Oleic oil | 5.55 Kg. |
| (5) | Corn oil | 2.77 kg. |
| (6) | Sweet whey protein concentrate (assay 50% protein) | 11.80 kg. |
| (7) | Milk solids, non-fat (37% protein) | 15.95 kg. |
| (8) | Lecithin concentrate | 1.16 kg. |
| (9) | Ascorbyl palmitate | 7.8 g. |

The lactose (1) is dissolved in appoximately 55 l. of water and heated to 140°–150° F. A blend of the four oil ingredients (2–5) which is prepared in a separate vessel and warmed to 115° F. is then added to the lactose solution. The lecithin concentrate (8) and ascorbyl palmitate (9) are dissolved in the oil before adding to the lactose solution. A quantity of condensed skim milk to provide the milk solids non-fat (7) indicated is warmed to 150°–155° F. and added to the foregoing mixture with thorough mixing. The temperature of the mixture is then adjusted to within the range of 140°–155° F. and the sweet whey protein concentrate (6) is incorporated therein. The mixture is neutralized to pH 6.6–6.9 and the remaining ingredients are then added thereto. The mixture is then pumped through a homogenizing apparatus, heated to 175° F. and spray dried to provide a powder containing 2–4% moisture. This base is then dry blended with sufficient lactose to provide 100 kg. of product. Vitamin and mineral ingredients are added to provide the following amounts of vitamin and minerals per 100 g. of product.

| Vitamin A, IU | 1560 | Choline, mg | 39 |
|---|---|---|---|
| Vitamin D, IU | 312 | Inositol, mg | 23 |
| Vitamin E, IU | 7.8 | Calcium, mg | 360 |
| Vitamin C, mg | 43 | Phosphorus, mg | 240 |
| Folic Acid, mcg | 39 | Iodine, mcg | 35 |
| Thiamine, mg | 0.39 | Iron, mg | 9.4 |
| Riboflavin, mg | 0.47 | Magnesium | 35 |
| Niacin, mg | 6.2 | Copper, mg | 0.3 |
| Vitamin $B_6$, mg | 0.3 | Zinc, mg | 3 |
| Vitamin $B_{12}$, mcg | 1.2 | Manganese, mcg | 27 |
| Biotin, mcg | 12 | Sodium, mg | 144 |

| | | | |
|---|---|---|---|
| Pantothenic Acid, mg | 2.3 | Potassium, mg | 540 |
| Vitamin K, mcg | 47 | Chloride, mg | 350 |

The foregoing dry composition is then constituted with water at the rate of 128 g. thereof per liter of formula to provide a nutritionally complete dietary product suitable for feeding to infants as the sole item of diet.

What is claimed is:

1. A fat composition consisting of a mixture of selected vegetable oils containing from 20% to 50% by weight of palm oil, from 10% to 45% by weight of a lauric acid oil selected from the group consisting of coconut oil, babassu oil, and palm kernel oil, from 10% to 25% by weight of an oleic acid oil selected from the group consisting of oleic oil and olive oil, and up to 20% by weight of a linoleic acid oil selected from the group consisting of corn oil, soybean oil, sunflower seed oil and safflower oil wherein for each 100 parts by weight of fatty acids present as triglycerides in said composition from 28 to 46 parts by weight thereof are oleic acid, from 18 to 28 parts by weight thereof are palmitic acid, and from 6 to 16 parts by weight thereof are linoleic acid wherein the aggregate of oleic acid and palmitic acid exceeds 50 parts by weight, said composition being adapted for feeding to an infant as the sole fat ingredient of a nutritionally complete liquid formula product.

2. The fat composition of claim 1 containing 33 to 40 parts by weight of oleic acid and 20 to 24 parts by weight of palmitic acid.

3. The fat composition of claim 1 consisting of about 40% by weight palm oil, 30% by weight coconut oil, 20% by weight of oleic oil, and 10% by weight corn oil.

4. A nutritionally complete dietary product adapted for infant feeding as the sole item of diet containing assimilable carbohydrate, fat, and protein ingredients wherein the composition of claims 1, 2, or 3 is the sole fat ingredient.

* * * * *